United States Patent
Ziesche et al.

[11] 3,732,893
[45] May 15, 1973

[54] SOLENOID VALVE

[75] Inventors: Kurt Ziesche, 7141 Neckarrems; Waldemar Hans; Josef Duffner, both of 8600 Bamberg; Gerhard Brüne, 7141 Schwieberdingen; Alfred Grob, 7141 Oberstenfeld, all of Germany

[73] Assignee: Robert Bosch GmbH, Stuttgart, Germany

[22] Filed: Mar. 6, 1972

[21] Appl. No.: 232,082

[30] Foreign Application Priority Data

Mar. 5, 1971  Germany............P 21 10 596.4

[52] U.S. Cl. ............137/625.65, 137/544, 251/282, 251/129
[51] Int. Cl. ..................F16k 31/10, F16k 39/00
[58] Field of Search.................137/625.65, 544; 251/282

[56] References Cited

UNITED STATES PATENTS 3,661,183   5/1972   Komaroff et al. ..............137/625.65

Primary Examiner—Henry T. Klinksiek
Attorney—Edwin E. Greigg

[57] ABSTRACT

In a solenoid valve the axially movable magnet armature (driving piston) is connected through an actuating ram with a valve head which is movable between two valve seats and which is urged against the electromagnet force by a spring-biased counterpiston engaging said valve head at its end remote from said ram.

11 Claims, 3 Drawing Figures

PATENTED MAY 15 1973　　3,732,893

SOLENOID VALVE

BACKGROUND OF THE INVENTION

This invention relates to an electromagnetically operated valve having a pressure-equalized driving piston disposed within a valve housing and a valve body which is actuated by said driving piston and which, in one position, establishes communication and in another position blocks communication between a valve inlet and a valve outlet.

In a valve of the aforeoutlined type disclosed, for example, in Swiss Pat. No. 416,252, there is used, for closing the valve, a polarized magnet disposed at an outer wall of the valve housing. This structure has the disadvantage that the work piston, its rods and the bores in which they are disposed, have to be very accurately coaxial to ensure that jamming of the control piston is securely avoided. This requirement necessitates a high degree of precision in the machining with the inherent high cost of manufacturing. The work piston itself, because of its relatively large effective face and its relatively large mass has a switching frequency which is too low.

OBJECT AND SUMMARY OF THE INVENTION

It is an object of the invention to provide an improved solenoid valve which is free from the aforeoutlined disadvantages and which, despite large flow rates, has short switching times, and further, which is operationally safe to a superior degree, and which operates safely even after long periods of deenergized condition.

Briefly stated, according to the invention, the work piston is formed as the armature of a striker magnet and affects the movable valve head through an actuating ram separated from the armature. The movable valve head is provided with at least one valve seat and is operatively connected, at its end remote from the armature, with a counterpiston biased by a compression spring.

The invention will be better understood as well as further objects and advantages will become more apparent from the ensuing detailed specification of a preferred although exemplary embodiment taken in conjunction with the drawing.

DESCRIPTION OF THE PREFERRED EMBODIMENT

Figure 1:
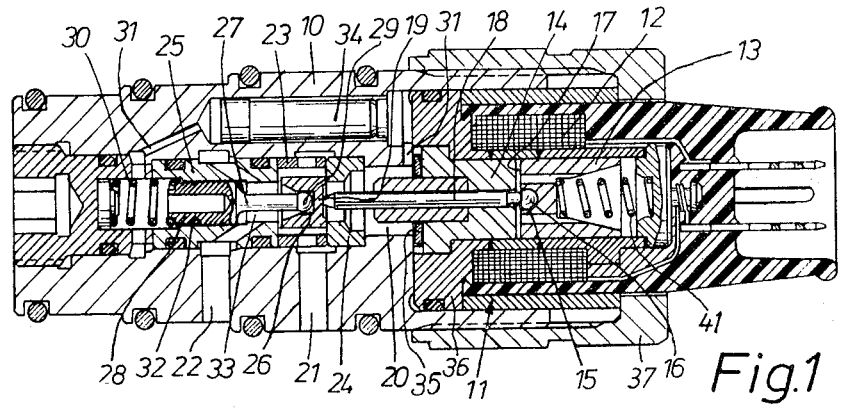
FIG. 1 is an axial sectional view of the preferred embodiment of the invention.
Figure 2:
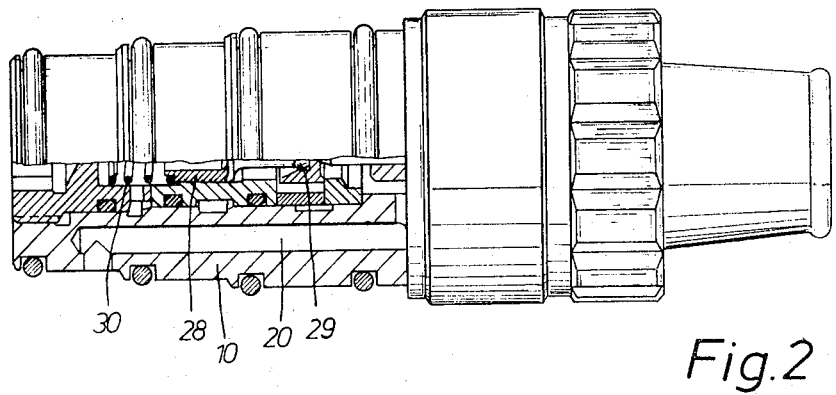
FIG. 2 is a partially sectional axial view of the same embodiment taken through a sectional plane different from that in FIG. 1

Turning now to FIGS. 1 and 2, there is shown a valve housing 10 in which there is disposed an electromagnet 11 having a winding 12, an armature 13 serving as the work piston of the valve, and a core 14. In an opening 15 of the armature 13 there is inserted a hardened metal sphere 16 which is ground flush with the radial face 17 of the armature 13. The displacements of the magnet armature 13 are transmitted to a movable valve head 19 by a ram 18 engaging the sphere 16. The valve head 19, when the winding 12 is in a deenergized condition, blocks communication between an inlet 20 and an outlet 21, while it establishes, at the same time, communication between the outlet 21 and a return port 22. When, on the other hand, the winding 12 is in an energized condition, the valve head 19 is in a position in which communication is maintained between the inlet 20 and the outlet 21, while communication is blocked between the outlet 21 and the return port 22. The valve head 19 is movable in an intermediate sleeve 23 which is disposed between and is in engagement with an annulus 24 and a guide sleeve 25. A first valve seat which is disposed between the inlet 20 and the outlet 21 is situated coplanar with that face of the intermediate sleeve 23 which is in engagement with the annulus 24. A second valve seat is situated coplanar with that face of the intermediate sleeve 23 which is in engagement with the guide sleeve 25. This arrangement is advantageous in that each valve seat may be lapped simultaneously with the adjacent radial face of the intermediate sleeve 23. In this manner the stroke of the magnet is determined by the difference in axial length between the valve head 19 and the intermediate sleeve 23.

The valve head 19 has, at its end remote from the electromagnet 11, an opening 26, into which there is inserted a sphere 29 affixed to the terminus of a stem 27 of a counterpiston 28. The latter, by virtue of a biased coil spring 30 urges the valve head 19 into the position shown in FIGS. 1 and 2 when the winding 12 of the electromagnet 11 carries no current. Thus, as it may be observed, in the last-named position of the valve head 19, communication is blocked between the inlet 20 and the outlet 21. The counterpiston 28 is connected with the inlet 20 through channels 31 and thus is exposed to the pressure of the work fluid which affects, through the inlet 20, the valve head 19 and the armature 13 of the electromagnet 11. By means of this arrangement there is achieved a force equalization, so that short switching periods can be obtained independently from the pressure of the admitted work fluid. In designing the effective cross sections it was found to be particularly advantageous when the effective sealing face of the second valve seat which is adjacent the counterpiston is at least approximately as large as the work face of the counterpiston. A spring 41, having a force smaller than that of spring 30, maintains the components 13, 18, 19 and 28 in operational contact with one another.

In view of the fact that the switching time of the solenoid valve is greatly affected by the friction of the counterpiston 28 in its guide bore 32 of the guide sleeve 25, it is a desideratum to maintain the sliding faces between the guide sleeve 25 and the counterpiston 28 free from dirt particles. Since the counterpiston 28 is unilaterally exposed to the pressure of the admitted work fluid and is in communication with a depressurized chamber 33, there occurs a pressure drop which causes an oil leakage through the gap between the guide sleeve 25 and the counterpiston 28. Since a fine filtering of the main flow would require a very large filter which would render the structure of the solenoid valve very voluminous, in the channels 31 there is expediently disposed a filter 34, which is so dimensioned that the aforenoted leakage flow may be filtered.

The same purpose, that is, a decrease of the friction and thus a shortening of the switching times of the solenoid valve is served by providing a separation of the actuating ram 18 from the armature 13 of the pressure magnet 11. By virtue of this arrangement, the actuating ram 18 and the individual parts of the electromagnet 11 do not have to be manufactured with high precision which would be necessary if the guide means for the armature 13 and for the actuating ram 18 were to extend in an exact axial alignment.

As a further measure for decreasing friction, the guide faces for the armature are provided with a coating of low friction coefficient, such as a chromium layer or a layer of synthetic material.

Further, the friction is also reduced when the core 14 of the electromagnet is urged into engagement with the housing 10 by means of a spring washer 35. In this manner, when the housing portion 36 is secured with the aid of a sleeve nut 37, bracings are avoided which under certain circumstances could affect the sliding capabilities of the armature 13.

Figure 3:
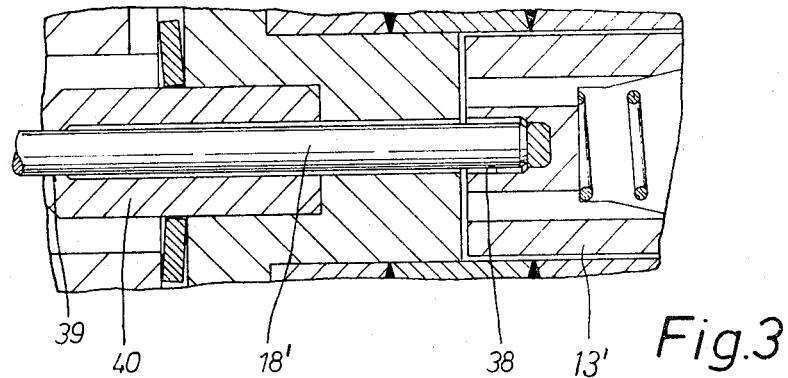
FIG. 3 is an axial sectional fragmentary view of a modified detail of the preferred embodiment.

In a further improvement of the solenoid valve a decrease in the switching period may be achieved by providing that the actuating ram 18' is, as illustrated in FIG. 3, guided loosely in a blind bore 38 of the armature 13', and is further guided in an annular shoulder 39 of an intermediate component 40.

The structures disclosed in this specification may find application in a 2/2-way valve as well.

What is claimed is:

1. In a solenoid valve of the known type having (a) a housing including a valve inlet and a valve outlet for fluid, (b) a pressure-equalized drive piston, (c) a movable valve head operatively connected to said drive piston and adapted to assume a first position in which communication is maintained between said valve inlet and said valve outlet and a second position in which communication is blocked between said valve inlet and said valve outlet, (d) a valve seat cooperating with said valve head and disposed between said valve inlet and said valve outlet, the improvement comprising
  A. a solenoid,
  B. a magnet armature movably disposed in said housing and displaceable by the energization and deenergization of said solenoid, said armature constituting said drive piston,
  C. an actuating ram operatively connected with, but constituting a component separate from said armature,
  D. a movable valve head having
    1. a first end oriented towards said armature and being in engagement with said actuating ram,
    2. a second end oriented away from said armature,
  E. a movable counterpiston in engagement with said second end of said valve head and
  F. a compression spring in engagement with said counterpiston for urging said valve head, said actuating ram and said armature into one of said positions.

2. An improvement as defined in claim 1, including a return port in said housing and an additional valve seat cooperating with said valve head and situated between said valve outlet and said return port.

3. An improvement as defined in claim 2, wherein a surface of said counterpiston is exposed to the pressure of said fluid, the effective area of said additional valve seat is at least approximately as large as said surface of said counterpiston.

4. An improvement as defined in claim 2, including an intermediate sleeve surrounding said valve head and having two opposed radial edge faces, one of said valve seats being coplanar with one of said radial edge faces and the other of said valve seats being coplanar with the other of said radial edge faces.

5. An improvement as defined in claim 1, including
  A. a depressurized chamber,
  B. a pressurized chamber separated from said depressurized chamber by said counterpiston,
  C. channel means maintaining communication between said pressurized chamber and said valve inlet and
  D. a filter disposed in said channel means.

6. An improvement as defined in claim 1, including
  A. a guide sleeve provided with a bore for slidably receiving said counterpiston in a snug fit,
  B. a sphere affixed to that end of said counterpiston which is oriented towards said valve head,
  C. means forming part of said valve head and defining an opening receiving said sphere for causing said counterpiston to carry said valve head and
  D. an intermediate sleeve disposed adjacent said guide sleeve, said valve head being surrounded by and movable within said intermediate sleeve.

7. An improvement as defined in claim 1, including an intermediate sleeve surrounding said valve head and having a radial edge face, said valve seat being disposed coplanar with said radial edge face.

8. An improvement as defined in claim 1, including
  A. a magnet core,
  B. spring means in engagement with said magnet core and
  C. tightening means clamping said magnet core against said housing overcoming the force of said last-named spring means.

9. An improvement as defined in claim 1, wherein the sliding faces for the armature are coated with a synthetic material.

10. An improvement as defined in claim 1, wherein the sliding faces for the armature are coated with chromium.

11. An improvement as defined in claim 1, including
  A. means forming part of said armature and defining an opening therein into which extends a terminus of said actuating ram and
  B. an intermediate component having an annular shoulder guiding said actuating ram.

* * * * *